(12) United States Patent
Bien et al.

(10) Patent No.: US 8,183,494 B2
(45) Date of Patent: May 22, 2012

(54) METHOD FOR CONNECTING A SHEET METAL COMPONENT, SUCH AS A PIPE, TO A CAST METAL COMPONENT, SUCH AS A HOUSING PORT, IN PARTICULAR FOR AN EXHAUST SYSTEM

(75) Inventors: Wilfried Bien, Seevetal-Emmelndorf (DE); Jan Peter Elfeldt, Hamburg (DE); Michael Halves, Hamburg (DE); Thomas Huelsberg, Buchholz (DE); Uwe Klussmann, Bispingen (DE); Hildwin Kuzi, Eppelheim (DE); Holger Nuhn, Schneverdingen (DE); Ralf Puenjer, Hamburg (DE); Olav Reinhardt, Hamburg (DE); Dirk Riewert, Hamburg (DE); Alfred Riggers, Freetz-Lengenbostel (DE); Thorsten Sternal, Moisburg (DE)

(73) Assignee: BorgWarner Inc., Auburn Hills, MI (US)

( * ) Notice: Subject to any disclaimer, the term of this patent is extended or adjusted under 35 U.S.C. 154(b) by 952 days.

(21) Appl. No.: 10/590,534

(22) PCT Filed: Feb. 23, 2005

(86) PCT No.: PCT/EP2005/001873
§ 371 (c)(1),
(2), (4) Date: May 10, 2007

(87) PCT Pub. No.: WO2005/080045
PCT Pub. Date: Sep. 1, 2005

(65) Prior Publication Data
US 2007/0289954 A1    Dec. 20, 2007

(30) Foreign Application Priority Data
Feb. 25, 2004 (DE) .......... 10 2004 009 109

(51) Int. Cl.
*B23K 10/00* (2006.01)
(52) U.S. Cl. .......... 219/121.46; 219/121.45; 219/137 R; 219/121.59
(58) Field of Classification Search ............. 219/121.45, 219/121.46, 121.59, 127, 125.1, 137 R; 126/116 R
See application file for complete search history.

(56) References Cited

U.S. PATENT DOCUMENTS
4,138,986 A * 2/1979 Combs et al. ............. 126/116 R
(Continued)

FOREIGN PATENT DOCUMENTS
CH          414889 A      6/1966
(Continued)

OTHER PUBLICATIONS

Aichele: "Schutzgasschweißen—Verfahren Anwendung Wirtschaftlichkeit," 1981, pp. 14-19 and 124-127, Messer Griesheim GmbH, Germany.

(Continued)

*Primary Examiner* — Mark Paschall
(74) *Attorney, Agent, or Firm* — William G. Anderson; Stephan A. Pendorf; Patent Central LLC

(57) ABSTRACT

In the method according to the invention for connecting a sheet metal component (3) to a component (5) consisting of cast metal, the sheet metal component (3) and the component (5) are welded to one another by means of a pulse-welding method. In particular, a sheet metal pipe (3) can thereby be welded to the port (12) of a housing (13) consisting of cast metal. This advantage may be utilized for an exhaust system with an exhaust manifold (3) and an exhaust assembly, such as a turbocharger (5).

8 Claims, 1 Drawing Sheet

U.S. PATENT DOCUMENTS

| | | | |
|---|---|---|---|
| 4,152,575 A | 5/1979 | Banas | |
| 5,268,555 A | 12/1993 | Jones et al. | |
| 5,521,353 A * | 5/1996 | Mitsui et al. | 219/127 |
| 5,761,905 A | 6/1998 | Yamada et al. | |
| 6,343,417 B1 | 2/2002 | Bonny et al. | |
| 6,510,920 B1 | 1/2003 | Durand | |

FOREIGN PATENT DOCUMENTS

| | | |
|---|---|---|
| DE | 2922563 A1 | 12/1979 |
| DE | 19702367 A1 | 7/1997 |
| DE | 197 21 092 C1 | 9/1998 |
| DE | 19752773 A1 | 6/1999 |
| DE | 198 08 383 A1 | 9/1999 |
| DE | 198 19 946 A1 | 11/1999 |
| DE | 19819946 A1 | 11/1999 |
| DE | 100 22 052 A1 | 3/2001 |
| DE | 20113032 A | 11/2001 |
| DE | 10050158 A1 | 4/2004 |
| EP | 0 761 939 A1 | 3/1997 |
| EP | 0 921 052 A2 | 6/1999 |
| EP | 0 939 208 A2 | 9/1999 |
| EP | 0939208 A2 | 9/1999 |
| JP | 10 314948 | 12/1998 |

OTHER PUBLICATIONS

Anik, S., et al.; "Schweisseignung metallischer Werkstoffe" DVS-Verl., 1995, p. 198.

Hiltunen, P., "Das Pulsschweissverfahren" Bänder, Bleche, Rohre Bd. 44 (2003), No. 5/6 2003, pp. 36-39.

Nording, T., "Neuartiges Konzept für isolierte Abgaskrümmer, Vorrohre und Katalysatoren" MTZ Motortechnische Zeitschrift Bd. 52, No. 4, Apr. 1991 Stuttgart, pp. 206-210.

EWM-Schweisslexikon, WIG-Fibel, Aug. 2002.

EWM-Schweisslexikon, MIG/MAG-Fibel, Aug. 2002.

Dilthey, U.; "Wärmebehandlung der Stähle vor dem schweissen während dem Schweissen und nach dem Schweissen", first page, Schweisstechnische Fertigungsverfahren 2, 3., bearbeitete Auflage 2005, Springer Berlin Heidelberg, Kapitel 9.

* cited by examiner

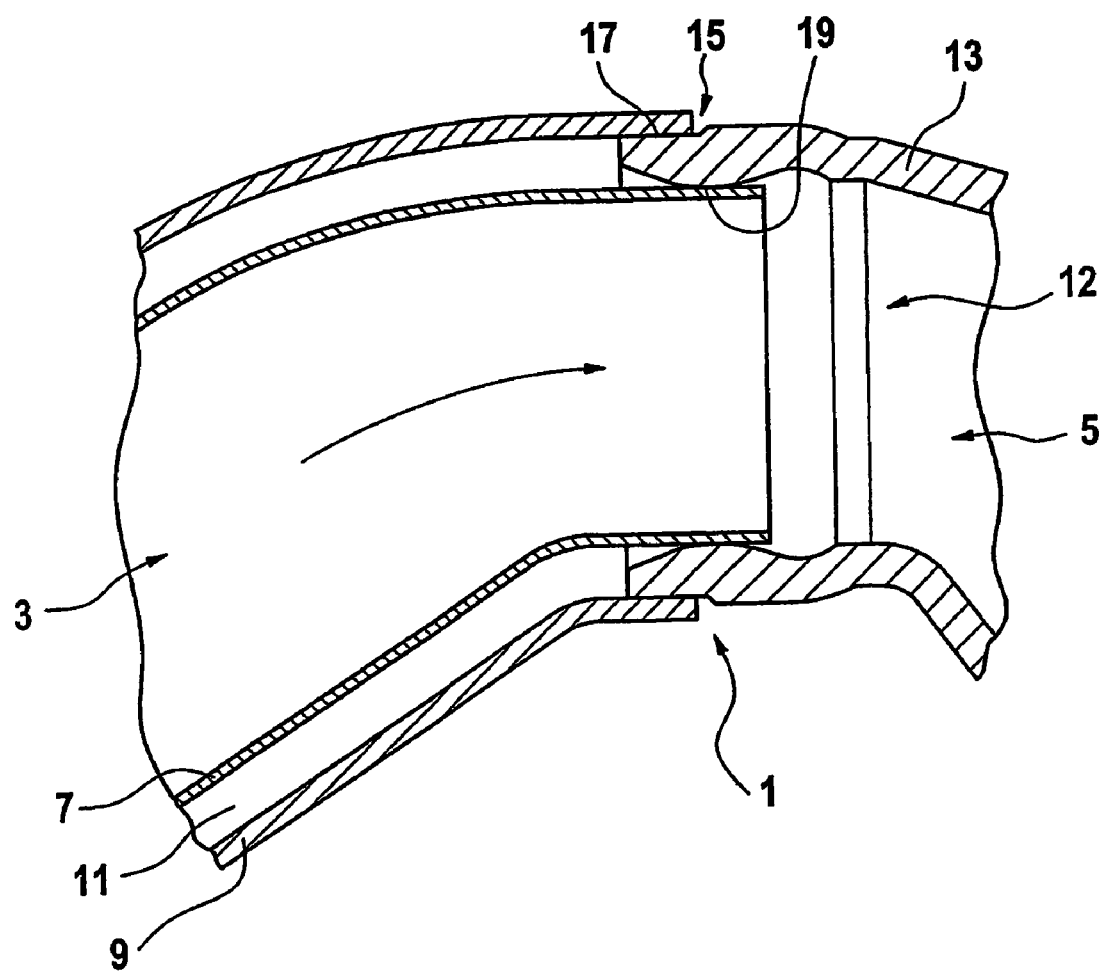

METHOD FOR CONNECTING A SHEET METAL COMPONENT, SUCH AS A PIPE, TO A CAST METAL COMPONENT, SUCH AS A HOUSING PORT, IN PARTICULAR FOR AN EXHAUST SYSTEM

CROSS-REFERENCE TO RELATED APPLICATION

This application is a national stage of PCT/EP2005/001873 filed Feb. 23, 2005 and based upon DE 10 2004 009 109.9 filed Feb. 25, 2004 under the International Convention.

BACKGROUND OF THE INVENTION

1. Field of the Invention

The invention relates to a method for connecting and to a connection of a sheet metal component to a component consisting of cast metal. The invention relates particularly to a method for connecting a pipe to a housing port, to a connection between a pipe and a housing port and to an exhaust system.

Connections between pipes consisting of sheet metal and, for example, housing ports consisting of cast iron material are normally provided by means of flanges, including a seal. Only in this way is it possible to ensure a leakage-free transport of, for example, hot gases between the pipe and the housing port.

In exhaust systems of motor vehicles, there is provision, according to previous concepts, for connecting a sheet metal manifold and a cast iron turbine housing of an exhaust gas turbocharger to one another by means of a screwed flange connection. An alternative to this is what is known as the integral manifold in which an exhaust manifold and the turbine housing are cast from one piece.

2. Description of Related Art

It is known from the publication DE 198 19 946 A1 to weld a gas defection element for an exhaust manifold to an engine-side flange in a gastight manner. This flange is in this case, in turn, to be screwed to the engine. However, no direct connection between the exhaust manifold and the engine or, as required, a turbocharger is made as a result of this measure.

It is disclosed in publication DE 100 22 052 C2 to tie up an inlet funnel of a turbine housing directly to a manifold by means of a weld seal. A welding of these two components within an exhaust system is in this case possible only because the inlet funnel and the manifold are manufactured from sheet metal.

SUMMARY OF THE INVENTION

The background of the present invention is to implement a direct connection between a pipe consisting of sheet metal and a housing consisting of cast metal.

For this purpose, a method having the features of a connection and an exhaust system are proposed.

In the method according to the invention for connecting a sheet metal component to a component consisting of cast metal, the sheet metal component and the component are welded to one another by means of a pulse-welding method.

The invention overcomes the difficulty of welding cast metal to sheet metal. Reasons for this difficulty are different melting properties, which are temperature-dependent, different flow properties and different structures of these two metallic materials.

In a preferred embodiment of the method according to the invention, there is provision for connecting a pipe to a housing port, the pipe being manufactured from at least one sheet metal component and at least the housing port being manufactured from cast metal. The port and the at least one sheet metal component are welded together by means of a pulse-welding method and/or by means of a pulsed welding current source.

It is thus possible to implement a direct, stable and gastight connection between two devices consisting of different metallic materials, in this case sheet metal and cast metal. In this application, differences which normally arise with respect to wall thicknesses of the pipe to be welded to the housing port present problems. Due to high wall thicknesses, a large amount of heat is drawn off from a melt occurring during welding, as a result of which, in turn, cracks occur at the weld seam and the heat influence zones. Difficulties of this kind are overcome by means of the method according to the invention.

Owing to the measure according to the invention of using a pulsed welding current source during welding, only a relatively small amount of heat is introduced into the weld seam. It is then possible to weld the at least one sheet metal component of the pipe to the housing port consisting of cast metal homogeneously and in a crack-free manner. A thermal energy density introduced by the pulsed welding current source acts only briefly on the joining partners along the weld seam.

The connection provided by the method according to the invention ensures, for example, a leakage-free transport of hot gases, such as, for example, exhaust gases, between the pipe and the housing.

In conventional welding methods, the weld seam is exposed, for example, to scaling, abrasion or high thermal loads of a structure partially converted due to welding, when this weld seam lies directly in a hot gas stream. There is the risk, here, that the weld seam comes loose.

A laser welding method, a TIG welding method (tungsten inert gas) or an MAG welding method (metal active gas) may be employed in order to carry out the method according to the invention. By means of the laser welding method, it is possible to act upon the weld seam between the pipe and the housing port with extremely brief pulses and thus to heat said weld seam accurately. In the TIG welding method, an arc burns between a workpiece and a nonfusible tungsten electrode. The MAG welding method is a particularly flexible arc welding method, since it is suitable for welding within a range of high sheet metal thicknesses of 0.5 mm upward. In the MAG welding method, melting additives may be used in order to generate the weld seam.

In one embodiment, there may be provision for at least those regions of the at least one sheet metal component and of the housing port which are to be welded to be thermally controlled to a suitable processing temperature before welding. By virtue of this additional measure, it is possible to counteract too high a temperature gradient at those regions of the at least one sheet metal component and of the housing port which are to be welded, that is to say where the weld seam occurs. Thermal inhomogeneities which cause cracks are thus avoided along the weld seam occurring during welding. These regions are either to be preheated or to be cooled, depending on an existing initial temperature. Within the framework of a large-scale manufacturing process, there is the possibility of welding components to be welded together immediately after a preceding manufacturing step in which at least one of the components has been heated. In this case, it is possible to control thermally at least one component to be welded to the processing temperature within an annealing furnace.

On the other hand, a controlled cooling of at least one of the components to be welded together may be advantageous, after welding, in the case of specific material combinations, in order to increase the stability of the weld seam.

If there is provision for connecting a double-walled pipe, which is manufactured from an inner pipe and an outer pipe manufactured from the at least one sheet metal component to the housing port, then, according to a preferred embodiment of the method according to the invention, there is provision for introducing the inner pipe into the housing port, for pushing the outer pipe onto the port, where appropriate, and for welding the port to the at least one sheet metal component from which the outer pipe is manufactured. In this embodiment of the invention, therefore, there is provision for welding the housing solely to the at least one sheet metal component of the outer pipe by means of a pulse-welding method. A sliding fit is thus implemented between the inner pipe and the housing port.

In the connection according to the invention between a sheet metal component and a component consisting of cast metal, there is provision for the sheet metal component and the component to be welded to one another by means of a pulse-welding method. It is thus possible to allow a connection between the sheet metal component and the component consisting of cast metal, which differ from one another in terms of their structures and their temperature-dependent melting and flow properties.

In a preferred embodiment of the invention, there is provision for a connection to be provided between a pipe and a housing port, the pipe being manufactured from at least one sheet metal component and at least the housing port being manufactured from cast metal. The connection according to the invention is designed in such a way that the port and the at least one sheet metal component are welded to one another by means of a pulsed welding current source and/or by means of a pulse-welding method. A stable, leakage-free and direct connection between the pipe and the housing port, which are produced from different metallic materials, is thus implemented.

According to the invention, flanges which have hitherto been necessary to provide a connection between gas-carrying parts consisting of sheet metal and of cast metal may be dispensed with. Thus, in order to provide the connection, both material, weight and construction space can be saved. Even when the connection according to the invention is exposed to high temperatures generated, for example, by exhaust gas streams, there is no risk of crack formation.

In a preferred embodiment of the invention, there is provision for the housing to be designed as part of an exhaust assembly of, for example, a turbocharger. In this case, the port is designed as an inflow gas duct of this exhaust assembly. There is further provision, in this case, for the pipe to be designed as an exhaust manifold. In applications in the motor vehicle sector, weight optimization and optimal construction space utilization are obtained within exhaust systems as a result of the invention, since a flange otherwise required for providing such connections is unnecessary.

In a further embodiment of the invention, there is provision for the exhaust manifold to be designed as an airgap-insulated exhaust manifold. The pipe from which the exhaust manifold is produced has an inner pipe and an outer pipe which is manufactured from the at least one sheet metal component. In this case, the inner pipe and the outer pipe are separated from one another by an airgap.

The inner pipe is introduced into the housing port, the outer pipe is pushed onto the port and the port is welded to the at least one sheet metal component from which the outer pipe of the exhaust manifold is manufactured. By virtue of this measure, a jamming of the inner pipe due to thermal expansion caused by hot exhaust gases is prevented. Since the inner pipe is pushed into the port and therefore the inflow gas duct of the exhaust assembly, direct contact of the exhaust gases with a weld seam present between the inflow gas duct and the at least one sheet metal component of the outer pipe of the exhaust manifold is additionally avoided.

By means of the invention, it is possible to transport exhaust gases with a temperature of up to 1050° C. between the airgap-insulated exhaust manifold and the turbocharger in a leakage-free manner. To provide this connection, an outer wall of the inflow gas duct is designed, for example, cylindrically corresponding to an inner wall of the outer pipe.

The exhaust system according to the invention, with an exhaust manifold which is manufactured from at least one sheet metal component and with an exhaust assembly having a housing with a port, at least the port being manufactured from cast metal, has a connection between the exhaust manifold and the exhaust assembly. In this case, there is provision for the port of the exhaust assembly and the at least one sheet metal component from which the exhaust manifold is manufactured to be welded to one another by means of a pulsed welding current source. Within the exhaust system having the features according to the invention, it is possible to transport hot exhaust gases between the exhaust manifold and the exhaust assembly in a leakage-free manner.

If a pulse-welding method, such as, for example, an MAG, TIG or laser welding method, is employed to make the connection to be welded between the exhaust manifold and the exhaust assembly, a durable welded joint is produced between the exhaust manifold and the exhaust assembly, without heat treatment, such as, for example, annealing, being necessary in this case. However, where individual material combinations are concerned, a preheating or a controlled cooling of components to be welded to one another may also be expedient.

In a preferred embodiment of the exhaust system according to the invention, the exhaust manifold is designed as an airgap-insulated exhaust manifold and the exhaust assembly as a turbocharger. Since it is possible, according to the invention, to avoid a flange connection between the airgap-insulated exhaust manifold and the turbocharger, leakage within the exhaust system is avoided, so that exhaust regulations are reliably adhered to.

By virtue of the measure of providing a sliding fit between the inner pipe of the airgap-insulated exhaust manifold and the inflow gas duct of the turbocharger, it is possible to introduce high exhaust gas temperatures of up to 1050° C. On account of this airgap-insulated design of the exhaust manifold, stresses at a weld seam between the exhaust manifold and the turbocharger are avoided. According to the invention, the weld seam does not lie directly in the gas stream, so that, when the exhaust system is in operation, the weld seam is exposed to low temperatures, as compared with the high temperatures of the exhaust gases. It is thus possible, in turn, to design the connection more favorably in geometric terms, so that much smaller wall thicknesses are required.

Thermal expansion of the inner pipe or gas-carrying pipe, highly heated during the operation of the exhaust system, of the airgap-insulated exhaust manifold is compensated in a simple way due to the sliding fit between the gas-carrying pipe and the turbocharger. The gas-carrying pipe can in this case expand into the turbocharger, without forces in this case being transmitted, that is to say a free expansion of the gas-carrying or inner pipe in relation to the inflow gas duct of the turbocharger is possible.

Normally, wall thicknesses of the outer pipe of the airgap-insulated exhaust manifold (approximately 2 mm) and of the wall of the inflow gas duct of the turbocharger (approximately 4 mm) differ markedly from one another. By the measure of utilizing a pulsed welding current source for connecting these two components, the difficulty of providing a stable and/or gastight weld seam, arising in the case of conventional welding methods and due to the difference in wall thicknesses and the difference in materials, is overcome.

Further advantages and embodiments of the invention may be gathered from the description and the accompanying drawing.

It will be appreciated that the features mentioned above and those yet to be explained below can be used not only in the combination specified in each case, but also in other combinations or alone, without departing from the scope of the present invention.

BRIEF DESCRIPTION OF THE DRAWINGS

The invention is illustrated diagrammatically in the drawing by means of exemplary embodiments and is described in detail below with reference to the drawing.

FIG. 1 shows an embodiment of an arrangement according to the invention in a diagrammatic illustration.

FIG. 1 shows a connection 1 between a pipe of an exhaust manifold 3 and a port 12 of a housing 13 of an exhaust assembly, in particular of a turbocharger 5. There is provision for the exhaust manifold 3 to have an inner pipe 7 and an outer pipe 9, at least the outer pipe 9 being manufactured from at least one sheet metal part. Moreover, an airgap 11 is present between the inner pipe 7 and the outer pipe 9.

DETAILED DESCRIPTION OF THE INVENTION

Accordingly, in the present case, the exhaust manifold 3 is designed as an airgap-insulated exhaust manifold 3. The housing 13 of the turbocharger 5 is manufactured from cast metal.

To provide, according to the invention, the connection 1 according to the invention between the exhaust manifold 3 and the turbocharger 5, there is provision for a cylindrical integrally formed portion 15 to be integrally formed in the region of a port 12 of the housing 13, that is to say the inflow gas duct of the turbocharger 5, on an outer wall.

When the double-walled exhaust manifold 3 is assembled with the housing 13 of the turbocharger 5, there is provision for first introducing the gas-carrying inner pipe 7 into the port 12, that is to say on an inner wall of the housing 13 of the turbocharger 5. The outer pipe 9 of the exhaust manifold 3 is pushed onto the housing 13 of the turbocharger 5 at the cylindrical integrally formed portion 15 on the inflow gas duct 12 of the housing 13.

Subsequently, there is provision for the housing 13 of the turbocharger 5 to be welded along the cylindrical integrally formed portion 15 solely to the outer pipe 9 of the airgap-insulated exhaust manifold 3 by a pulse-welding method by means of a pulsed welding current source.

By the pulse-welding method being employed, low heat energy is briefly introduced per welding pulse into a welding point 17 between the housing 13 and the outer pipe 9. A suitable pulse-welding method which may be employed in this case is a laser welding method or TIG welding method or MAG welding method.

By virtue of this procedure according to the invention, it is possible, between the sheet metal part, such as the outer pipe 9 of the exhaust manifold 3, and a component consisting of cast metal, such as the housing 13 of the turbocharger 5, to implement the connection 1 according to the invention in such a way that the latter is of mechanically stable and/or gastight form. As explained below, a normal welding method, in which a large amount of heat energy is introduced into the welding point 17, as compared with the procedure according to the invention, is not suitable for this purpose.

The difficulty of welding a component consisting of cast metal to a sheet metal component is due to the different melting properties of these two metallic materials. Sheet metal and cast metal differ from one another in different melting temperatures, different flow properties and different structures. This makes it difficult to implement a homogeneous, mechanically stable or gastight welded joint between these two metallic materials by means of conventional welding methods. Moreover, as in the present case, there are also considerable differences in wall thickness between the outer pipe 9 and the housing 13. On account of the higher wall thickness of the housing 13, in conventional welding methods there is the risk that a large amount of heat is drawn off from the melt, which may lead to crack formations.

According to the invention, a wall of the port 12 of the housing 13 of the turbocharger 5 issues into the airgap 11 between the inner pipe 7 and the outer pipe 9 of the airgap-insulated exhaust manifold 3. In this case, according to the invention, account is taken of the fact that a sliding fit 19 is present between an inner wall of the port 12 of the housing 13 and the inner pipe 7 of the airgap-insulated exhaust manifold 3.

The connection 1 according to the invention is arranged within an exhaust system of a motor vehicle. The airgap-insulated exhaust manifold 3 is connected to cylinders of an internal combustion engine. Exhaust gases occurring during the operation of the internal combustion engine in this case flow in the direction of the curved arrow through the gas-carrying inner pipe 7 of the airgap-insulated exhaust manifold 3 in the direction of the turbocharger 5. Thermally induced expansions of the gas-carrying inner pipe 7 which in this case occur are compensated within the connection 1 according to the invention on account of the sliding fit 19 between the gas-carrying inner pipe 7 and the inner wall of the housing 13 at the port 12. In this arrangement, it is possible that the gas-carrying inner pipe 7 can execute a displacement in relation to the housing 13 at the sliding fit 19, relative to the inner wall of the housing 13, in order to compensate thermal expansions.

Moreover, the airgap-insulated design of the exhaust manifold 3 ensures that the welding point 17 is not exposed directly to the flowing exhaust gases at the connection 1 between the outer pipe 9 and the housing 13. Thus, owing to the airgap insulation, the welding point 17 is acted upon by lower temperatures than the actual temperatures of the exhaust gases. The welding point 17 is therefore exposed to relatively minor stresses. The connection according to the invention can accordingly be designed favorably in geometric terms in the case of small wall thicknesses. Tests carried out for this purpose have shown that, by the connection 1 being designed according to the invention, exhaust gases with temperatures of up to 1050° C. can be transported from the exhaust manifold 3 to the turbocharger 5.

According to the invention, independently of special applications, it is possible, in exhaust systems of motor vehicles, to implement a stable crack-free welded joint between a sheet metal component, such as the outer pipe 9 of the airgap-insulated exhaust manifold 3, and a component consisting of cast metal, such as the housing 13 of the turbocharger 5. The hot exhaust gases flowing within the gas-carrying inner pipe 7 of the airgap-insulated exhaust manifold 3 in the direction of the arrow into the turbocharger 5 are transported, free of leakage, through the connection 1 according to the invention.

It has hitherto been necessary for connections of this type, in particular in exhaust systems, between two components, which are produced from different metallic materials, such as sheet metal in the case of the exhaust manifold 3 and cast metal in the case of the housing 13 of the turbocharger 5, to be connected to one another via a flange connection. By the connection 1 being produced and designed according to the invention, a flange of this type may in this case be dispensed with.

It is thus possible for connections in exhaust systems, such as the connection 1 according to the invention, to be designed optimally. Since a flange is no longer required, a material saving and a weight reduction are achieved, and, moreover, space problems are solved.

Now that the invention has been described, We claim:

1. A method for connecting an airgap-insulated exhaust manifold (3) to an inlet port (12) of a housing (13) of a turbocharger,
    the exhaust manifold having an inner pipe (7), which is a gas-carrying pipe (7) of the exhaust manifold (3), and an outer pipe (9), which outer pipe (9) is manufactured from at least one sheet metal component, and
    at least the port (12) of the turbocharger housing (13) being manufactured from cast metal, said method comprising:
    introducing the inner pipe (7) into the port (12) of the housing (13) of the turbocharger and
    welding the port (12) by means of a pulse-welding method to the at least one sheet metal outer pipe (9).

2. The method as claimed in claim 1, wherein the connection is provided by means of a pulsed welding current source.

3. The method as claimed in claim 1, wherein a laser welding method is employed.

4. The method as claimed in claim 1, wherein a TIG welding method is employed.

5. The method as claimed in claim 1, wherein an MAG welding method is employed.

6. The method as claimed in claim 1, wherein at least those regions of the at least one sheet metal component (9) and of the port (12) of the exhaust assembly (5) which are to be welded together are thermally controlled to a processing temperature before welding.

7. The method as claimed in claim 1, wherein at least those regions of the at least one sheet metal component (9) and of the port (12) of the exhaust assembly (5) which are to be welded together are cooled in a controlled manner after welding.

8. An airgap-insulated exhaust manifold (3) connected to an inlet port (12) of a housing (13) of a turbocharger,
    wherein the exhaust manifold (3) has an inner pipe (7)), which is a gas-carrying pipe (7) of the exhaust manifold (3), and an outer pipe (9), the outer pipe (9) being manufactured from at least one sheet metal component,
    wherein at least the port (12) of the housing of the turbocharger is manufactured from cast metal,
    wherein the connection is formed by introducing the inner pipe (7) of the exhaust manifold (3) into the port (12) of the turbocharger while sliding the outer pipe over the outside of the inlet port (12), and producing a weld joining the at least one sheet metal outer pipe (9) and the turbocharger inlet port (12) by means of a pulse-welding method.

* * * * *